United States Patent [19]

Wada et al.

[11] Patent Number: 4,820,492
[45] Date of Patent: Apr. 11, 1989

[54] APPARATUS FOR DENITRATION

[75] Inventors: Toshimichi Wada, Hiroshima; Hiroshi Kuroda, Kure; Tomihisa Ishikawa, Kure; Yoshimichi Mori, Kure, all of Japan

[73] Assignee: Babcock-Hitachi Kabushiki Kaisha, Tokyo, Japan

[21] Appl. No.: 13,522

[22] Filed: Feb. 11, 1987

[30] Foreign Application Priority Data

Feb. 12, 1986 [JP] Japan .................................. 61-26950

[51] Int. Cl.⁴ ...................... G05D 7/00; B01D 53/36; F01N 3/28
[52] U.S. Cl. .................................... 422/111; 422/171; 422/176
[58] Field of Search ......................... 423/237, 239 A; 422/171, 172, 176, 194, 62, 111

[56] References Cited

U.S. PATENT DOCUMENTS

| | | | |
|---|---|---|---|
| 3,810,361 | 5/1974 | Weaving et al. | 422/171 |
| 3,813,226 | 5/1974 | Heitland et al. | 422/171 |
| 4,160,009 | 7/1979 | Hamabe | 422/111 |
| 4,188,364 | 2/1980 | Gladden | 422/171 |
| 4,207,209 | 6/1980 | Matsuda et al. | 423/239 A |
| 4,302,205 | 11/1981 | Muraki et al. | 422/111 |
| 4,455,281 | 6/1984 | Ishida et al. | 422/111 |
| 4,473,536 | 9/1984 | Carberg et al. | 423/239 A |
| 4,571,329 | 2/1986 | Kato et al. | 423/239 A |

FOREIGN PATENT DOCUMENTS

| | | | |
|---|---|---|---|
| 2902706 | 7/1979 | Fed. Rep. of Germany | 422/171 |
| 84771 | 7/1976 | Japan | 423/239 A |
| 97975 | 8/1978 | Japan | 423/239 A |
| 20955 | 2/1979 | Japan | 422/171 |
| 231490 | 12/1984 | Japan | 422/171 |

Primary Examiner—David L. Lacey
Assistant Examiner—Joye L. Woodard
Attorney, Agent, or Firm—Armstrong, Nikaido, Marmelstein & Kubovcik

[57] ABSTRACT

A denitration apparatus is useful for the treatment of an NOx-containing untreated gas from an offgas source. The apparatus includes a means for feeding the NOx-containing untreated gas, a means connected to the feeding means so as to charge ammonia into the untreated gas, a denitration reactor with a catalyst packed therein, and a means for discharging the thus-denitrated gas. The apparatus also includes a bypass means, which connects the gas-discharging means to the gas-feeding means at a location upstream of the duct of the ammonia-charging means so that a portion of the untreated gas is caused to bypass the denitration reactor and is then mixed in the resultant gas. The apparatus further includes a means for regulating the flow rate of the untreated gas to be caused to pass through the bypass means.

5 Claims, 12 Drawing Sheets

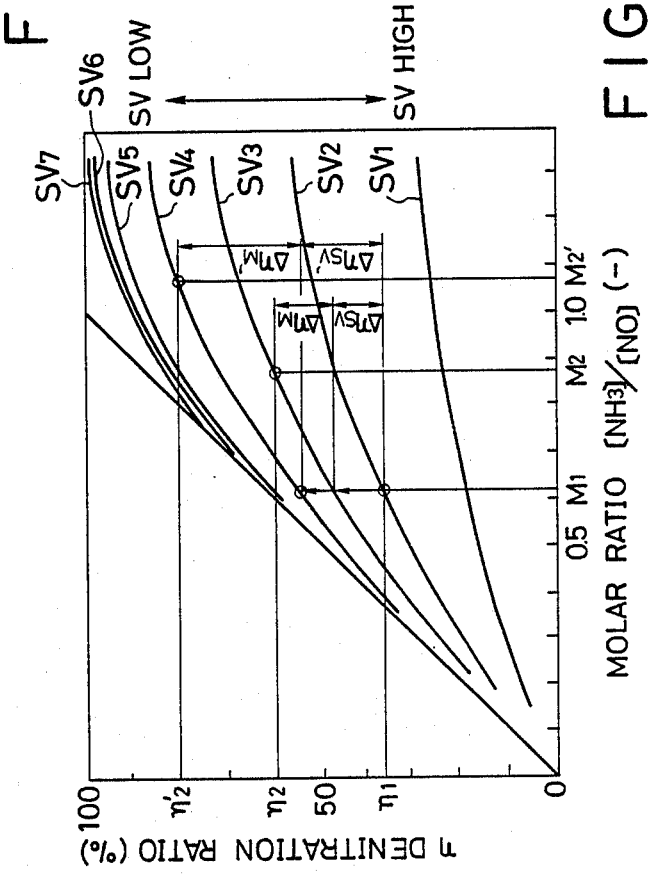
FIG. 3
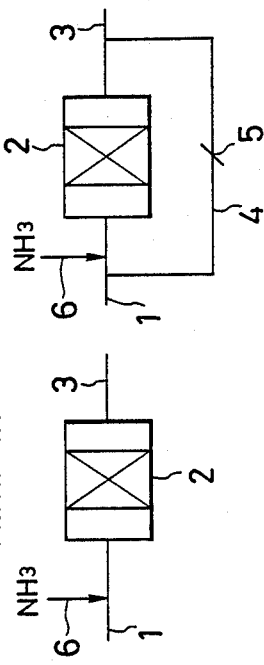
FIG. 4 (I) PRIOR ART   FIG. 4 (II)

MOLAR RATIO=0.8

$SV_1 = 3400\ h^{-1}$
$SV_2 = 5700\ h^{-1}$
$SV_3 = 8500\ h^{-1}$
$SV_4 = 17000\ h^{-1}$
$SV_5 = 28000\ h^{-1}$

MOLAR RATIO=1.0

$SV_1 = 5700\ h^{-1}$
$SV_2 = 8500\ h^{-1}$
$SV_3 = 11000\ h^{-1}$
$SV_4 = 21000\ h^{-1}$

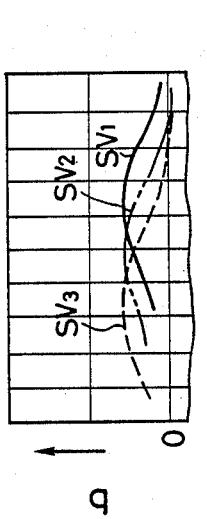
FIG.15
MOLAR RATIO=0.8
$SV_1 = 5700\ h^{-1}$
$SV_2 = 4300\ h^{-1}$
$SV_3 = 3400\ h^{-1}$
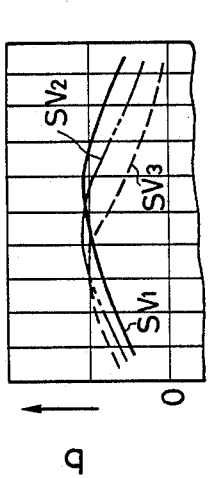
FIG.14
MOLAR RATIO=0.6
$SV_1 = 5700\ h^{-1}$
$SV_2 = 4300\ h^{-1}$
$SV_3 = 3400\ h^{-1}$
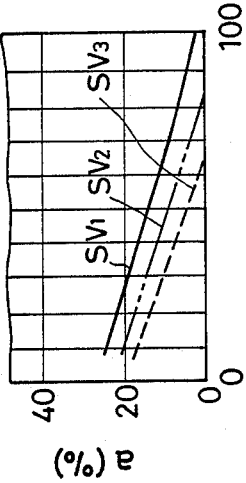
PROPORTION OF THE AMOUNT OF THE CATALYST PACKED IN THE PRIMARY REACTOR
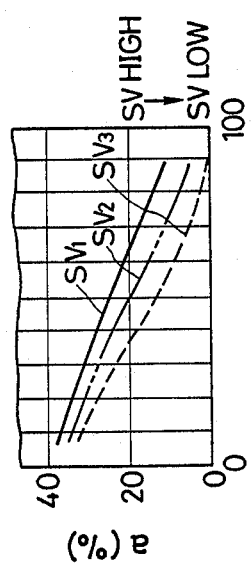
PROPORTION OF THE AMOUNT OF THE CATALYST PACKED IN THE PRIMARY REACTOR

4,820,492

APPARATUS FOR DENITRATION

BACKGROUND OF THE INVENTION

This invention relates to an apparatus for denitration which can remove the nitrogen oxides (hereinafter referred to as NOx) in the combustion offgases discharged from combustion facilities such as industrial furnaces, a variety of boilers, gas turbines, waste treatment equipment, etc.

Recently, because of the limited supply of heavy oil, thermal power plants have been switching from the mono-fuel combustion of heavy oil to the mono-fuel combustion of coal, in order to reduce dependency on petroleum. Large capacity thermal power plants are now being built for the mono-fuel combustion of coal.

However, since coal is less combustible than petroleum, NOx and unburned carbon are likely to be formed in the offgas. Measures to reduce the NOx include flame splitting, the recirculation of the offgas, two-stage combustion, denitration in the furnace, and slow combustion.

Most coal combustion boilers are not operated continuously at full load. They usually follow a "daily start-stop" operation (hereinafter referred to as DSS) in which the operation is either carried out by loading up and down to 80% load, 50% load, and 25% load, or completely stopped; or they follow a "weekly stop-start" operation (hereinafter referred to as WSS) in which operation continues during the weekdays, when there is a great demand for power, but is stopped on the weekends. Thus, in effect, most thermal power plants run at a medium load.

Other styles of medium load power generation include the so-called combined plant, in which the thermal power generation boiler is used in combination with a gas turbine. This system has an exhaust heat recovering boiler and excellent starting characteristics. The plants of such a system follow the above-mentioned DSS or WSS operations.

But even though such systems are improvements over the conventional techniques, their discharge concentration of NOx still exceed the ever-stricter limits dictated by government regulations.

There are an increasing number of plants which have a denitration apparatus of a dry contact reduction system, in which the reaction is carried out in the presence of a catalyst using ammonia (hereinafter referred to as NH3) as a reducing agent.

FIG. 21 (to be mentioned later) is a system diagram of a conventional denitration apparatus of this kind. In the figure, an inlet flue 1, a denitration reactor 2, an ammonia-injecting means 6, an offgas source (such as combustion equipment, etc.) 7, an air heater 8, a ventilator 9 and a flue 10 are illustrated.

The offgas generated by combustion is vented from an offgas source 7 through an inlet flue 1 which leads to a denitration reactor 2. On the way, an ammonia-injecting means 6 is provided, which injects NH3, a reducing agent for the NOx in the offgas. The NOx in the offgas reacts with the NH3 by virtue of the catalyst contained in the denitration reactor 2 and decomposes into harmless water vapor and nitrogen gas.

In order to restrict the discharge of the unreacted portion of the NH3 used, (that is, to restrict the discharge amount of leaking ammonia), the amount of NH3 injected is restricted. Such restriction is required because of the fact that when the unreacted portion of the NH3 is vented from the denitration reactor 2, it reacts with the S03 in the gas; as a result, acidic ammonia sulfate adheres to the machinery or instruments downstream of the denitration reactor 2. This has the undesirable effect of lowering the efficiency of the heat exchange.

FIG. 22 (to be mentioned later) is a diagram showing the relation between the amount of ammonia injected (represented in terms of the molar ratio of ammonia to NOx) and denitration performance.

As shown in this figure, when $m_1$ is employed as the molar ratio in the operation, a denitration rate of $\eta_a$ is obtained. Of the amount of ammonia injected (a+b), (b) represents the amount consumed in the process of denitration, and the remainder, (a), is vented as leaking ammonia from the denitration reactor. Now, if the molar ratio is increased to $m_2$, the denitration rate can be raised to $\eta_b$. However, as the molar ratio is increased and the denitration rate approaches its ceiling, the amount of leaking ammonia (A) also increases to an undesirable degree.

In conventional plants, the injection molar ratio is usually restricted so as to make the concentration of the NH3 discharged as low as possible, in consideration of its effects upon the machinery and instruments downstream of the denitration reactor. It is supposed that the denitration reaction proceeds by the contact of the NH3 and the NOx absorbed on the catalyst surface; therefore, if the injection molar ratio is restricted, the amount of NH3 absorbed on the catalyst surface inevitably decreases, as compared to when the injection molar ratio is high. The denitration reaction cannot proceed efficiently on the whole catalyst surface. This was the problem encountered when considering the most efficient use of the catalyst.

SUMMARY OF THE INVENTION

The object of this invention is to provide an apparatus for denitration which can eliminate the above-mentioned defects in the conventional technique by rendering it possible to efficiently use a catalyst and improve the denitration performance; in the process, it reduces the amount of leaking NH3 and can reduce the amount of the catalyst used, while maintaining a denitration rate at substantially the desired level.

In order to achieve this object, the denitration apparatus is provided with a means for injecting ammonia into a gas to be treated (which contains nitrogen oxides), and a denitration reactor which contains a catalyst within it. By bringing the gas-ammonia mixture into contact with the catalyst, the amount of nitrogen oxides in the gas is reduced.

This apparatus is also characterized by a bypass with which the gas flow rate may be regulated (for example, by a damper). By relocating the ammonia-injecting means to the denitration reactor (and downstream of the bypass's fork) the flow of gas may be divided into two portions - one going to the reactor, and the other to the bypass. The gas which has flowed into the reactor and undergone the above-mentioned reduction, is mixed again with the gas which has flowed through the bypass.

BRIEF DESCRIPTION OF THE DRAWINSS

FIG. 3 shows the relation between the molar ratio and the rate of denitration;

Figure 5:
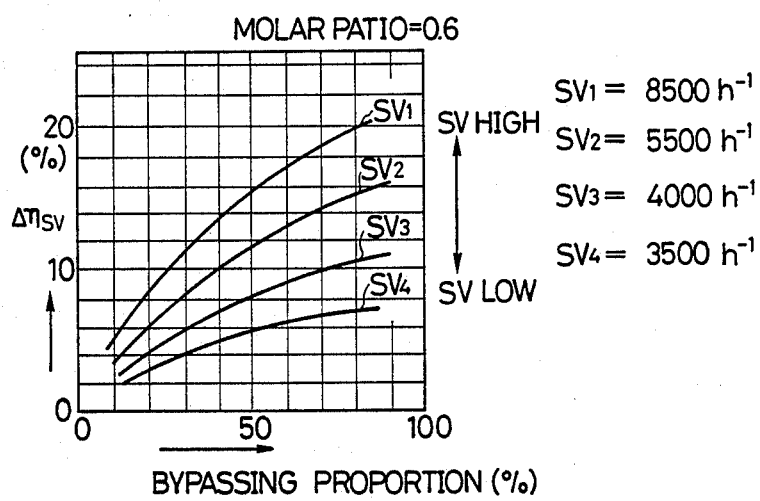
Figure 6:
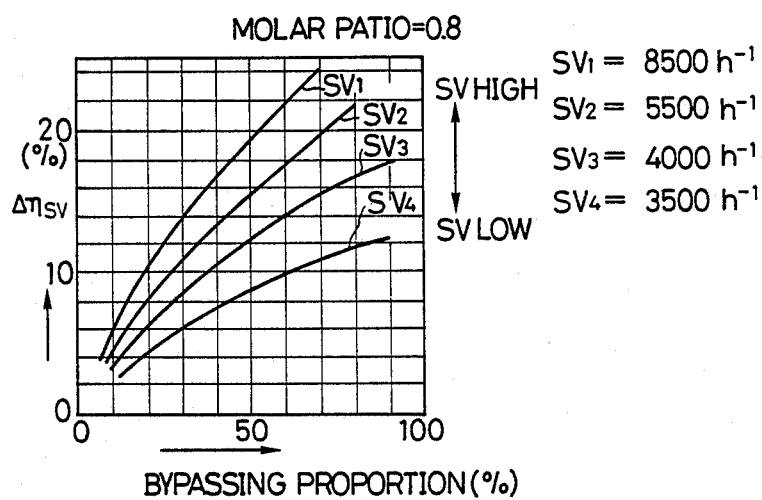
Figure 7:
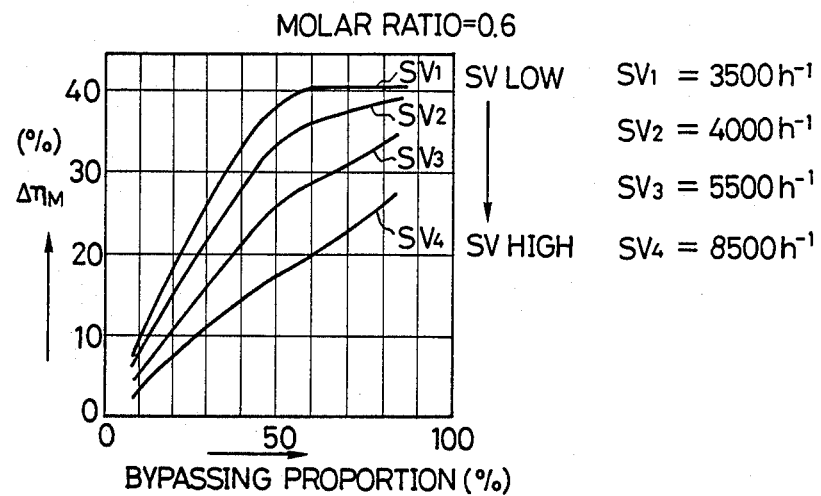
Figure 8:
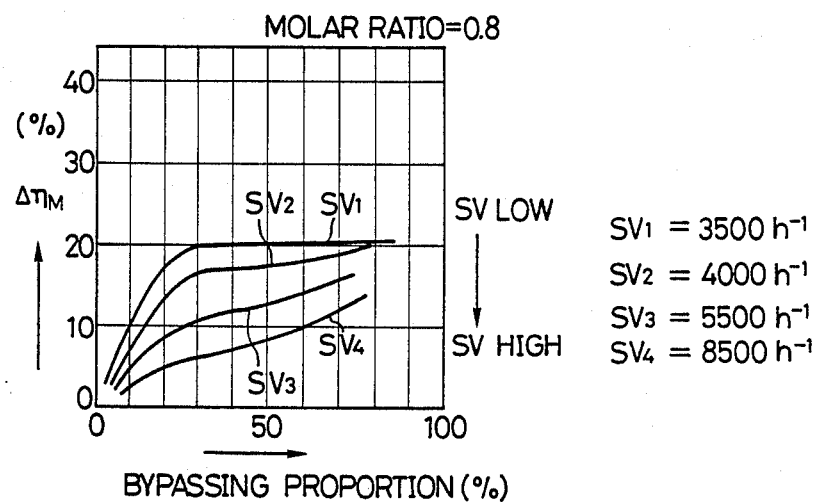
Figure 9:
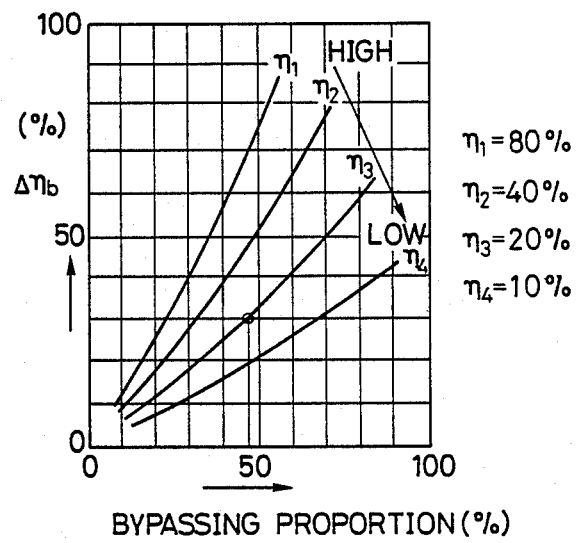
Figure 10:
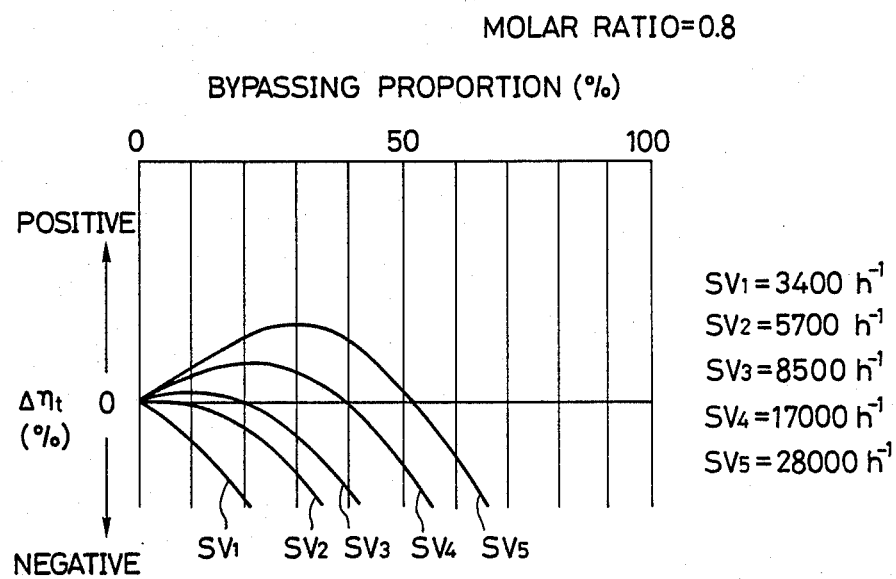
Figure 11:
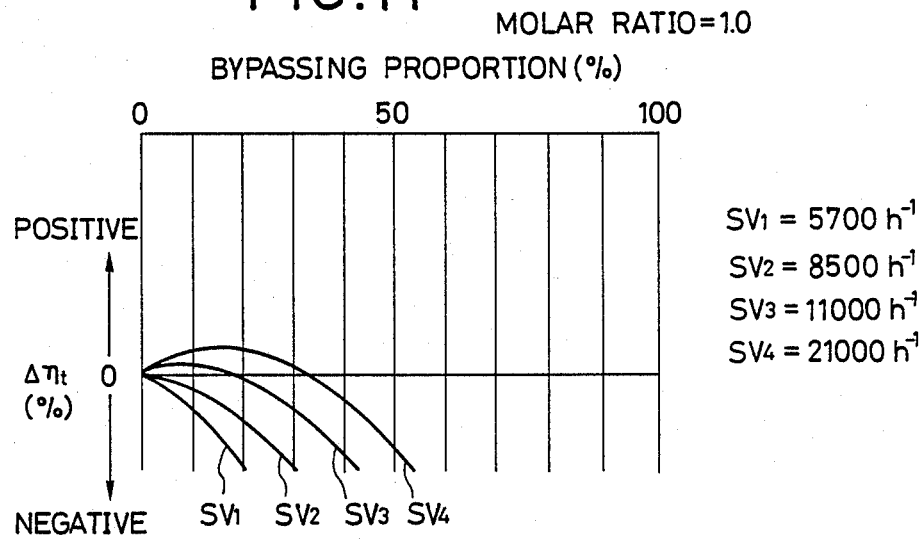
Figure 12:
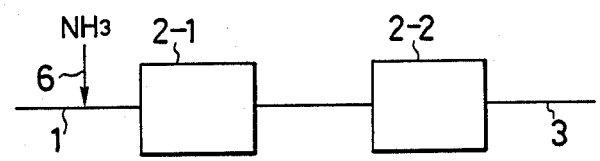
Figure 13:
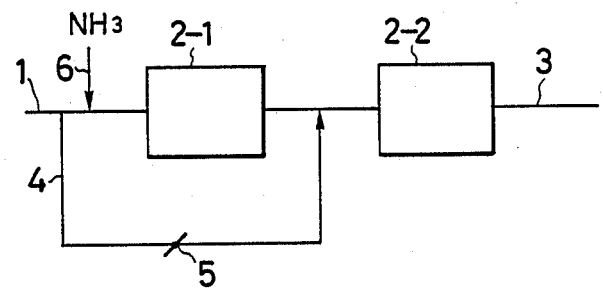
Figure 16:
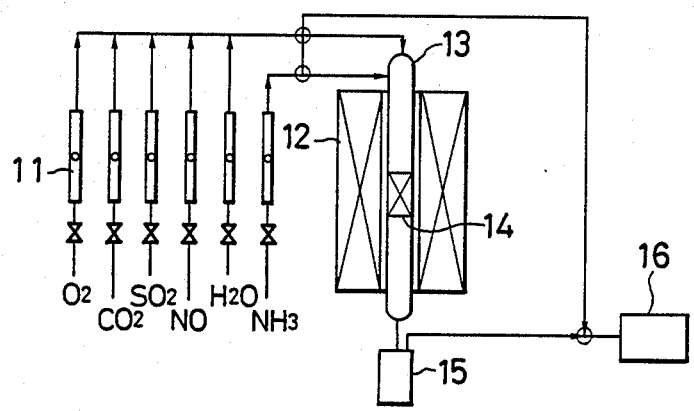
Figure 17:
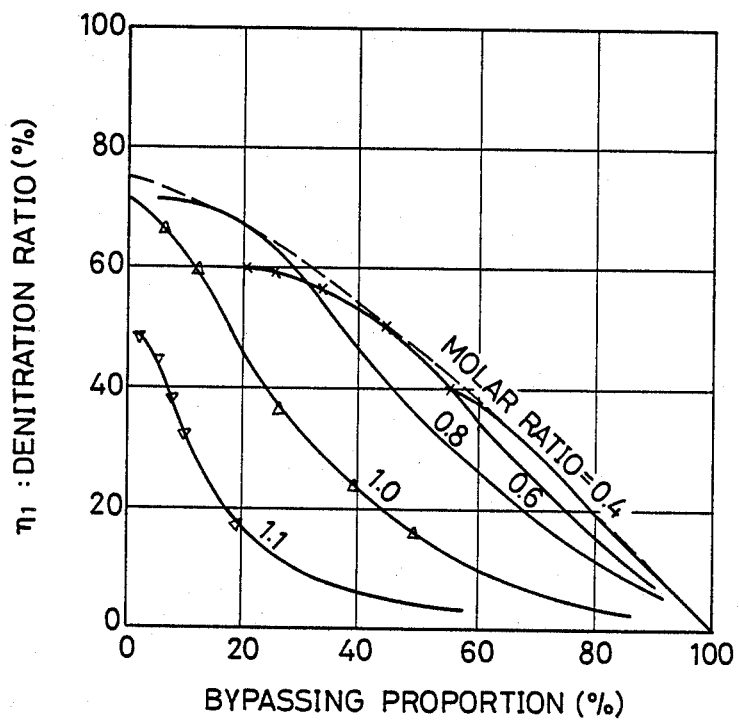
Figure 18:
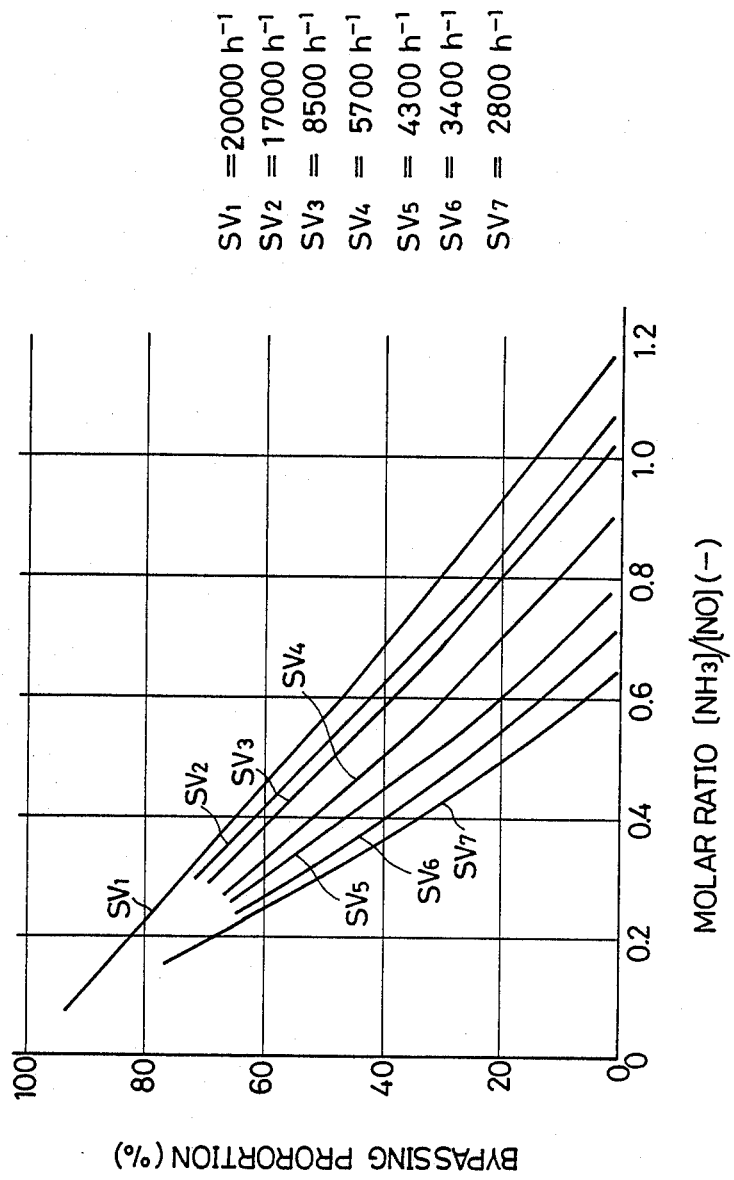
Figure 19:
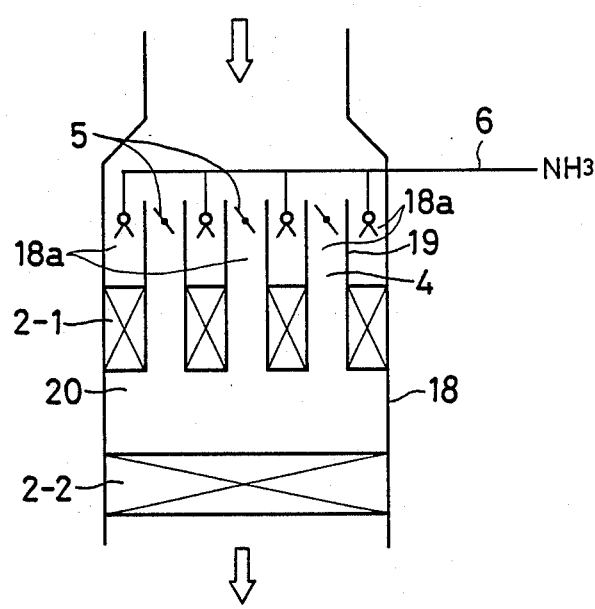
Figure 20:
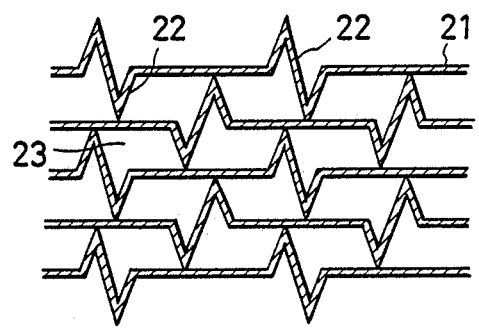
Figure 21:
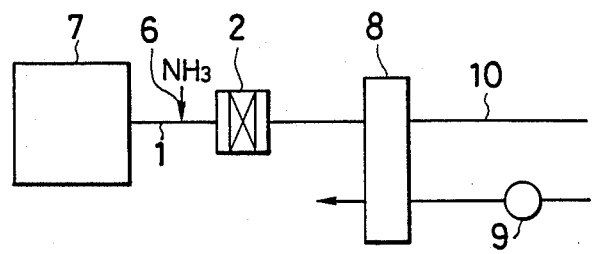
Figure 22:
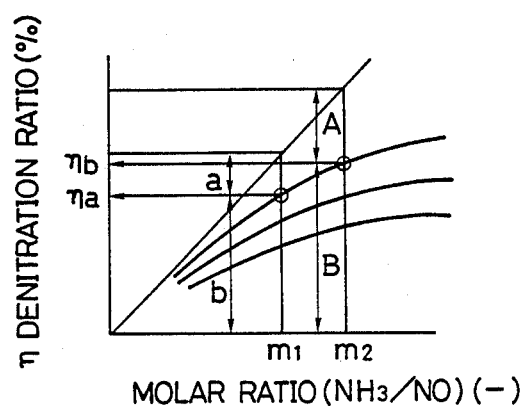

FIG. 4(I) compares the conventional art with the present invention's art of FIG. 4(II);

FIG. 5 shows the relation between the bypassing proportion and the $\Delta \eta SV$ in a low molar ratio operation;

FIG. 6 shows the relation between the bypassing proportion and the $\Delta \eta SV$ in a high molar ratio operation;

FIG. 7 shows the relation between the bypassing proportion and the $\Delta \eta_M$ in a low molar operation;

FIG. 8 shows the relation between the bypassing proportion and the $\Delta \eta_M$ in a high molar operation;

FIG. 9 shows the relation between the bypassing proportion and the $\Delta \eta_b$;

FIG. 10 shows the relation between the bypassing proportion and the $\Delta \eta_t$ in a low molar ratio operation;

FIG. 11 shows the relation between the bypassing proportion and the $\Delta \eta_t$ in a high molar ratio operation;

FIG. 12 is a system diagram of a system in which the denitration reactor has been divided in two against the stream of the gas;

FIG. 13 is a system diagram of a system in which the denitration reactor has been divided in two and a bypass flue has additionally been installed to it on the upstream side;

FIG. 14 shows the amount of catalyst reduction in a low molar ratio operation;

FIG. 15 shows the amount of catalyst reduction in a high molar ratio operation;

FIG. 16 is a diagram showing roughly the constitution of the apparatus used to measure the denitration rate of the present invention;

FIG. 17 shows the relation between the bypassing proportion and the denitration rate;

FIG. 18 shows the relation between the molar ratio, the SV, and the bypassing proportion;

FIG. 19 is a system diagram of the apparatus for denitration as described in third embodiment;

FIG. 20 is an enlarged cross-sectional view of the catalyst block used in the embodiments;

FIG. 21 is a system diagram showing the conventional apparatus for denitration; and FIG. 22 shows the general relation between the molar ratio and the rate of denitration.

DETAILED DESCRIPTION AND THE PREFERRED EMBODIMENTS OF THE INVENTION

With reference to embodiments and drawings, the present invention will now be explained more fully. (In the following explanations, the same symbols will be used interchangeably in describing the parts of conventional apparatuses as well as the parts of the invention.)

Figure 1:
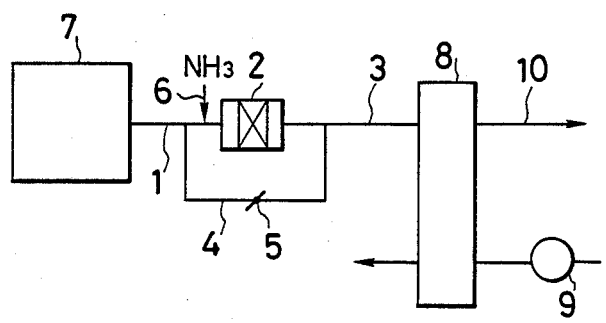
FIG. 1 is a system diagram of a denitration apparatus as described in first embodiment.

FIG. 1 is a system diagram of a denitration apparatus as used in first embodiment. In the figure, a bypass flue 4 going around the denitration reactor 2 and damper 5 are illustrated.

As shown by this figure, the offgas discharged from an offgas source 7 is channeled through an inlet flue 1 to the denitration reactor 2. The main difference from the prior art is that the denitration reactor is provided with a bypass flue 4 and a damper 5 located on the said bypass flue 4. The damper 5 regulates the amount of gas bypassing the denitration reactor 2. The ammonia-injecting means 6 is located downstream of the bypass fork, yet upstream of the denitration reactor 2.

In a denitration apparatus constructed in such a way, the treated gas which passed through the reactor 2, and the untreated gas which bypassed it, mix once again at the outlet flue 3. Thereafter, they are discharged through an air heater 8, etc. via the flue 10. The amount of ammonia injected by the apparatus 6 is controlled so that the ammonia concentration in the offgas at outlet flue 3 may not exceed the regulated amount.

Figure 2:
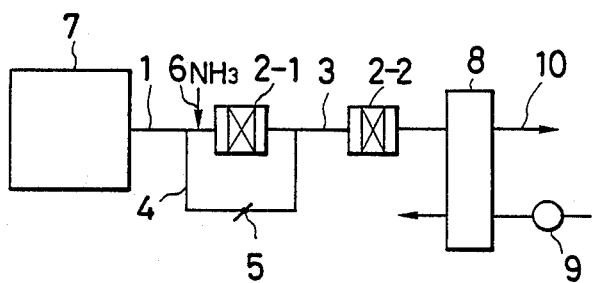
FIG. 2 is a system diagram of a denitration apparatus as described in second embodiment.

FIG. 2 is a system diagram illustrating the second embodiment of the invention. In this embodiment, the denitration reactor 2 (in the previous embodiment) is divided into a primary reactor 2-1 and a secondary reactor 2-2, along the stream of the gas. As in the first embodiment, a bypass flue 4 and a damper 5 on the said bypass flue 4 are provided; however, in this case they merely bypass the primary reactor 2-1.

As shown in the figure, the ammonia-injecting apparatus 6 is located downstream of the bypass fork, yet upstream of the primary reactor 2-1. The gas to be treated is channeled through the primary reactor 2-1, and the untreated gas which bypassed it mix at the outlet flue 3, which is upstream of the secondary reactor 2-2. Thus, it is constructed in such a way that the unreacted $NH_3$ (the leaking ammonia) contained in the treated gas discharged from the pirmary reactor 2-1, and the NOx in the untreated gas which bypassed it, can react in the secondary reactor 2-2. Furthermore, the amount of ammonia injected is controlled so that the ammonia concentration in the offgas at the outlet of the secondary reactor 2-2 may not exceed the regulated amount.

Next, in order to make the concrete effects of the present invention more understandable, a quantitative explanation will be given below.

FIG. 3 is a diagram showing the relation between the molar ratio and the denitration rate, as shown in FIG. 16. In that figure, a flow meter 11 which measures the flow rate of each gas, a heater 12, a reactor 13, a plate-type catalyst 14 carrying a reduction catalyst on the surface, an ammonia trap 15, and an NOx analyzer 16 are illustrated.

The following were the conditions of the experiment:

TABLE 1

| Amount of catalyst | 200 mm × 100 mm (one sheet) |
| --- | --- |
| Temperature | 350° C. |
| A/V | 51 m/h |
| Gas Composition | |
| NO | 200 ppm |
| $NH_3$ | Variant |
| $SO_2$ | 500 ppm |
| $O_2$ | 3% |
| $CO_2$ | 12% |
| $H_2O$ | 12% |

In FIG. 3, $SV_1$, $SV_2$, etc. represent the superficial velocity of the gas in the denitration reactor using the platetype catalyst (to be described later); they are defined as follows:

$$SV = \frac{\text{the amount of the gas treated (Nm}^3\text{/h)}}{\text{the amount of catalyst (M}^3\text{)}}$$

That is to say, the larger the SV, the larger the amount of gas treaed per unit volume of the catalyst. In other words, when the same amount of gas is treated, a high SV means a small amount of catalyst, and a low SV means a large amount of catalyst. In the figure, $SV_1$ is the largest, with $SV_2$, $SV_3$, etc. becoming smaller and smaller in that order.

By examining the curves shown in FIG. 3, the following characteristics become obvious:

(1) As the molar ratio increases from $M_1$ to $M_2$, to $M_3$, etc., the rate of denitration improves.
(2) However, as the denitration performance gradually approaches the ceiling, almost no improvement is shown above molar ratios larger than a certain value (about 1.2 or more).
(3) When the same amount of catalyst is added to conditions in which there is a high SV value (and a low denitration rate) and to conditions in which there is a low SV value (and a high denitration rate), the denitration rate is more effectively improved when there is a high SV value than when there is a low SV value.
(4) The larger the range within which the molar ratio is found, the larger the difference in the denitration performance resulting from the difference in the SV. In other words, the characteristic curves of $SV_1$, $SV_2$, etc. gradually separate from one another as the molar ratio increases.
(5) The higher the SV value, the smaller the gradient of the curve.

Taking the above characteristics into consideration, let us compare the denitration performances in two cases (See FIG. 4). Case 1 is a diagram of a conventional denitration apparatus; Case II is a diagram of the present invention.

In case II, a part of the offgas bypasses the denitration reactor 2 by being channeled through the bypass flue 4; hence, the amount of gas to be treated by the reactor 2 decreases by a corresponding amount. If the amount of the catalyst packed is the same as in Case I (the conventional process), we have a condition similar to the cases in the experiment in which small SV values were used.

Further, if the amount of ammonia injected is the same in both cases, the total amount of NOx in Case II decreases by the amount corresponding to the decrease in the amount of gas treated; this implies that a relatively large molar ratio is used in the operation. It may be mentioned that Case II uses a low SV and a high molar ratio in comparison with Case I.

With references to the curves shown in FIG. 3, Case I and Case II have the following differences:

When Case I, wherein the molar ratio is $M_I$ (0.6) and the SV value is $SV_2$ (12,000h$^{-1}$), is modified so that a part of the gas to be treated bypasses the reactor 2 as in Case II, it is found that the molar ratio goes up to $M_2$ (0.8), and the SV value falls down to $SV_3$ (8,500h$^{-1}$) The denitration performance before and after the reactor 2 rises from $\eta_1$ (38.0%) to $\eta_2$ (60%). It may be supposed from this that if the amount of gas bypassing the reactor 2 is increased, the molar ratio can be raised to $M_2$ (1.1), and the SV value can be lowered to $SV_4$ (6,500h$^{-1}$), thus making it possible to carry out an operation in which the denitration rate can be raised to $\eta_2'$ (80%).

The factors contributing to the improvement in the performance may be divided into those relating to the change in SV value, and those relating to the change in the molar ratio. In other words, $\Delta\eta_{SV}$ or $\Delta\eta_{SV}'$ may be taken to be due to the SV effect, while $\Delta\eta_M$ or $\Delta\eta_M'$ may be taken to be due to the effect of the increase in the molar ratio. The following relation may be thought to hold good:

$$\eta_1 + \Delta\eta_{SV} + \Delta\eta_M = \eta_2' \text{ or}$$

$$\eta_1 + \Delta\eta_{SV}' + \Delta\eta_{M'} = \eta_2'$$

Next, this $\Delta\eta_{SV}$ and $\Delta\eta_M$ will be explained more concretely.

FIGS. 5 and 6 shows the relations between the bypassing proportion of gas to be treated and $\Delta\eta SV$. FIG. 5 indicates the characteristic curves in the case of a low molar ratio (0.6). As shown in that figure, the larger the proportion of the bypassing gas, the smaller the amount of gas treated in the denitration reactor; $\Delta\eta_{SV}$ has a tendency to increase. But as described in characteristic (3) of the molar ratio/denitration rate curve, the effect gradually decreases. Also, for the same reason, when comparing $SV_1$, $SV_2$, etc., it is found that the larger the SV value, the larger the rate of change in $\Delta\eta_{SV}$.

FIG. 6 indicates the relations in the caes of a high molar ratio operation (0.8), wherein the values of $\Delta\eta_{SV}$ are largely different from those in FIG. 5. This stems from characteristic (4) in the molar ratio/denitration rate curve.

Next, FIGS. 7 and 8 show the relations between the bypassing proportion of the gas and $\Delta\eta_M$.

FIG. 7 indicates the case of a low molar ratio operation. As shown in the figure, the larger the proportion of bypassing gas, the larger the $\Delta\eta_M$; but the effect almost vanishes above a certain level. This stems from characteristic (2) of the molar ratio/denitration rate curve.

FIG. 8 indicates the case of a high molar ratio (0.8). Compared with FIG. 7, in this figure, $\Delta\eta_M$ reaches the ceiling when the bypassing proportion of the gas is in a small range. This is obvious from characteristics (1) and (2) in the above molar ratio/denitration rate curve.

As described above, it has become apparent that the characteristics of $\Delta\eta_{SV}$ and $\Delta\eta_M$ are important factors in performance improvement when the gas bypasses the denitration reactor 2. But the overall denitration performance should be evaluated by taking into consideration the decrease in performance resulting from the bypassing gas and comparing the above-described improvement factors $\Delta\eta_{SV}$ and $\Delta\eta_M$ therewith.

FIG. 9 indicates the decrease in $\Delta\eta_b$ in the overall denitration rate resulting from the bypassing of the gas to be treated.

As is clear from the figure, the higher the rate of denitration $\eta$, the larger the effect of the bypassing gas upon the overall denitration rate. Therefore, the overall evaluation of the denitration performance by the bypassing of gas should be made according to the following equation:

$$\Delta\eta_t = \eta_1 + \Delta\eta_{SV} + \Delta\eta_M - \Delta\eta_b$$

(wherein $\Delta\eta_t$ represents the effect upon the overall denitration rate.)

FIGS. 10 and 11 indicate the characteristic curves showing the relation between the bypassing proportion of the gas and $\Delta\eta_t$. FIG. 10 shows the case of a low molar ratio (0.8), and FIG. 11 shows the case of a high molar ratio (1.0).

As shown in FIG. 10, under the conditions of a low denit.ration rate (in the range of nearly $\eta_1 < 50\%$), the value of $\Delta\eta_t$ becomes positive in the range where the bypassing amount of gas is less than about 50%. However, when the denitration rate is high, the effect becomes lesser by being drastically affected by the value of $\eta_{SV}$, which decreases.

Also, when the proportion of bypassing gas is made too large, the value of $\eta_b$ increases rapidly, so that $\Delta\eta_t$ becomes negative and the overall denitration rate falls.

In the case of a high molar ratio operation, as shown in FIG. 11, the effect of $\Delta\eta_M$ is small (see FIG. 8), so that a large effect cannot be obtained, in comparison with a low molar ratio operation. Thus, in a low molar ratio operation, the value of $\Delta\eta_t$ becomes positive.

For the above reasons, when an operation of a low molar ratio and a low denitration rate is carried out, the performance can be enhanced by the construction of a system such as depicted in FIG. 4 (II), rather than FIG. 4 (I). In other words, if the same denitration rate is to be obtained in both cases, smaller amounts of catalyst will suffice for Case II.

Since the maximum bypassing proportion B (at which the overall denitration rate $\eta_t$ is found in the positive range) can be determined on the basis of the characteristic values shown in FIGS. 10 and 11, the relations between these and the denitration rates are plotted in FIG. 17.

The broken line in the figure indicates the curve of $B=156 \log(100-\eta_1)-216.7$. As clearly understood from each characteristic curve, the preferable bypassing proportion of the gas to be treated varies depending on the molar ratio. For instance, where the molar ratio is comparatively low (such as 0.4, 0.6, and 0.8), the preferable bypassing proportion of the gas is, for example, 20% to 80% by volume, or more preferably, 20% to 60% by volume. On the other hand, where the molar ratio is high (such as 1.0 or 1.1), the preferable bypassing proportion B is, for example, 5% to 20% by volume, or more preferably, 5% to 10% by volume.

The above explanation is effective so long as the molar ratio is low (in other words, an operation in which the leaking $NH_3$ has been restricted) and the SV value is high (in other words, it has a low denitration rate). But in the case of a low molar ratio and a low SV value (in other words, it has a high denitration rate), no effect can be expected.

However, if (as shown in FIG. 12) the denitration reactor has been divided into a primary and a secondary reactor disposed along the stream of gas, it implies that the same amount of gas is treated by a smaller amount of catalyst, so that the primary reactor 2-1 may be regarded as a high SV denitration reactor.

Accordingly, if only the primary reactor 2-1 is provided with a line bypassing the gas to be treated, the same effect as explained with regard to FIG. 4 (II) can be obtained.

The construction obtained from such considerations is shown as a system diagram in FIG. 13. This construction is characterized by the fact that the same denitration performance can be achieved by using the catalyst in a packed amount substantially smaller that the catalyst packed in the primary reactor 2-1 shown in FIG. 12.

FIGS. 14 and 15 show the characteristic curves in the above-described case. In FIG. 14, the molar ratio is low (about 0.6), and in FIG. 15, the molar ratio is high (about 0.8). In these figures the proportion of the amount of catalyst packed in the primary denitration reactor 2-1 to the total amount of catalyst is shown as abscissa; (a) is the bypassing proportion and (b) is the amount of the catalyst decreased. These characteristic curves are shown in the bypassing proportion of the gas at the maximum rate of decrease in the amount of catalyst; (the bypassing proportion of the gas treated at the maximum $\Delta\eta_t$ in FIGS. 10 and 11). Thus it follows that if the proportion of the catalyst amount packed varies, the most suitable bypassing proportion of the gas will also vary, as a matter of course.

In view of the above meaning, the amount of catalyst that can be reduced can be determined from the molar ratio and SV, so that, irrespective of whether the SV is high or low, the maximum amount of catalyst reduction can be determined. That is to say, if the amount of catalyst packed in the primary denitration reactor 2-1 is decreased, it results in an operation of a high SV, giving a large rate of decrease in the amount of catalyst. But as the decrease in the amount is given by (the amount of the catalyst packed) × (the rate of decrease), it becomes smaller by as much as the amount of catalyst packed is decreased. Therefore, in regard to the proportion of the catalyst packed in the primary reactor 2-1, there should be one point at which the decrease in the amount is largest. Thus, if the amount of the catalyst packed in the primary reactor 2-1 and the bypassing proportion of the gas to be treated are determined from such a consideration, it becomes possible to attempt the decrease in the amount of catalyst even when the SV is low.

FIG. 18 depicts the characteristic curves showing the relations between the molar ratio, SV, and bypassing proportion. In the operation of the denitration apparatus attached to the combustion equipment of ordinary utility boilers or industrial furnaces, etc., the SV is mostly in the range of $2,800h^{-1}$ to $20,000h^{-1}$. Accordingly, from the experimental results in FIG. 18, it is preferable that the relation between the molar ratio and the bypassing proportion should be made as nearly as shown in Table 2.

TABLE 2

| Molar ratio | Bypassing proportion (%) |
| --- | --- |
| Less than 0.2 | 70–90 |
| 0.2–0.4 | 35–80 |
| 0.4–0.6 | 10–65 |
| 0.6–0.8 | 5–50 |
| 0.8–1.0 | 5–30 |
| 1.0– | 5–15 |

In addition, as a practical problem, it is undesirable from the viewpoints of space and economy to provide a bypass flue for the bypassing proportion less than 5%; hence, in Table 2, the lower limit of the bypassing proportion has been taken to be 5%.

The ammonia/NOx ratio can be controlled by providing the ammonia-injecting means 6 with an ammonia flow-rate control means systematically in association with a flow rate sensor for the untreated gas fed through the inlet flue 1, an NOx sensor for determining the concentration of NOx in the untreated gas, and an bpening degree regulator for the damper 5.

This new denitration apparatus can be applied not only to newly-built plants, but also to existing ones. In effect, what is required is the use of an already-installed duct as the reactor's bypass flue, and the new installation of an additional denitration reactor. Also, when the surplus of the draft loss in the already-installed main line is small, only a secondary denitration reactor need be provided on the main line, so long as the primary reactor is provided with a bypass flue. In such a case, a denitration fan should be provided, but the draft capacity need not be large.

FIG. 19 illustrates a third embodiment of the present invention.

In the second embodiment (illustrated in FIG. 2), the primary and secondary denitration reactors are separately provided, but this example shows how the space inside a casing 18 has been divided in two to form the primary denitration reactor 2-1 and the secondary denitration reactor 2-2 In the figure, partition plates 19 which build up gas flow passages 18a in the casing 18 are illustrated. By disposing a plurality of them at regular intervals along the stream of gas (upstream of the casing 18), the primary reactor 2-1 and the bypass flue 4 are arranged. The nozzles of the ammonia-injecting means 6 are respectively arranged inside the partition plate 19 in positions above the primary reactor 2-1. Also, dampers 5 are disposed inside the partition plate 19 and upstream of the bypass flues 4. In the figure, reference numeral 20 is a mixing compartment between the primary reactor 2-1 and the secondary reactor 2-2.

In a denitration apparatus constructed in this way, when exhaust gas is introduced into the casing 18, the gas is separated into the treated portion which passes through the primary reactors 2-1, and the yet-to-be-treated (untreated) portion which passes through the bypass flues 4. The amount of gas bypassing may be regulated by means of the dampers 5 so as to give the optimum value.

The offgas introduced into the primary reactor side 2-1 is mixed with NH3 and is subjected to the denitration reaction in the primary reactors 2-1.

Thereafter, the unreacted NH3 contained in the exhaust gas which has already passed through the primary reactors 2-1, and the unreacted offgas which has passed through the bypass flues 4 are mixed in the above-described mixing compartment 20, and then led to the secondary reactors 2-2 wherein the NOx in the gas is removed by the ensuing denitration reaction. The resulting gas is led to the outlet of the casing 18.

A denitration apparatus of such a construction is especially adapted to be applied to an existing boiler plant to which no denitration apparatus has been attached. In most cases, when an attempt is made to newly provide a denitration apparatus in an already existing flue (casing 18), the space is frequently too limited to achieve the desired layout. In this regard, however, as shown in the above example, by reforming the inside of the casing 18, both the primary and the secondary denitration reactors can be provided within the casing. Moreover, the primary reactor 2-1 and the bypass flue 4 can be arranged in parallel, so that the height required for the apparatus can be reduced by so much. Therefore, the denitration apparatus of this invention can be newly constructed with ease even at an already-built boiler plant. Moreover, since it is of the built-in type within the flue (casing 18) of an already-built boiler plant, the cost of new construction for the denitration apparatus is minimized. Also, when a denitration apparatus provided with parallel bypass flues is to be constructed within an already-installed flue, the bypass flue which usually projects outward from it is a hindrance, and presents a problem, especially when there is not enough space between the flues (casing 18) and other equipment. In this regard, the construction described above is provided with bypass flues formed in parallel with the primary denitration reactor 2-1 within the casing 18, so that it can be applied even in cases where there is not much space.

In the denitration apparatus of the invention, it is also possible for the gas flow regulating apparatus to be disposed downstream of the bypass duct and upstream of the denitration reactor in order to regulate the flow rate of the gas to be treated. But in so doing, a drift is formed in the gas within the denitration reactor, exerting a bad influence upon the denitration performance. Therefore, it is advantageous that the gas flow regulating apparatus be disposed on the bypass flue as explained in the above embodiment.

FIG. 20 shows an enlarged cross-sectional view of the catalyst block used in the embodiment and in the previously-described experiment. On the surface of a catalyst carrier 21 in the form of a plate (such as a stainless steel plate, for example), a reduction catalyst is supported (such as, for example, containing $TiO_2$ catalyst, etc.). As shown in the figure, the carrier 21 has bents 22 projecting upward and downward at regular intervals. By super-imposing the carriers one upon the other, with bents 22 being arranged in staggered relation, spaces 23 are formed for the gas flowing between the carriers 21. As shown in the figure, a catalyst block is formed by superimposing a number of carriers 21, one upon the other, to be assembled into a block. By disposing a number of these catalyst blocks in the longitudinal direction as well as in the lateral direction, the above-described denitration reactor can be constructed.

Since the constitution of the present invention is as above described, it can provide an inexpensive denitration apparatus in which the catalyst can be efficiently utilized, even restricting the leaking $NH_3$ in the process; and further, can reduce the amount of catalyst used, while maintaining the desired rate of denitration.

While the invention has been described in detail and with reference to specific embodiments thereof, it will be apparent to one skilled in the art that various changes and modifications can be made therein without departing from the spirit and scope thereof.

I claim:

1. An apparatus for the denitration of the $NO_x$-containing untreated gas from an offgas source and comprising:
   (a) a denitration reactor with a catalyst packed therein, said catalyst being one which catalyzes the reaction between ammonia and $NO_x$,
   the denitration reactor being constructed by packing the catalyst in at least one of plural gas flow passages divided within a casing by partition members arranged along the direction of the flow of the untreated gas through the casing,
   and said reactor being adapted to receive an $NO_x$-untreated gas and ammonia therein so that the untreated gas and ammonia are brought into contact with the catalyst to reduce the $NO_x$ contained in the untreated gas and produce a treated gas;
   (b) feeding means connected to the denitration reactor for feeding an $NO_x$-containing untreated gas to the reactor;
   (c) ammonia-injecting means connected to the feeding means (b) for charging ammonia into the untreated gas and being provided upstream of said at least one gas flow passage of the denitration reactor;
   (d) discharging means connected to the denitration reactor for discharging the treated gas from the denitration reactor;
   (e) bypass means constructed by at least one of the remaining gas flow passages and being connected (i) to the feeding means (b) at a location upstream of the locatiion where the ammonia-injecting means (c) is connected to said feeding means and (ii) to the discharging means (d), for removing a portion of untreated gas from the feeding means (b) and feeding said portion of untreated gas to the discharging means (d) where it mixes with the treated gas; and (f) flow-rate regulating means for regulating the amount of untreated gas passed through the bypass means (e), said flow-rate regulating means being provided at the side of the inlet of said at least one gas flow passage as the bypass means.

2. The apparatus as claimed in claim 1, wherein the denitration reactor comprises a primary denitration reactor constructed by packing a portion of the catalyst in said one of the gas flow passages and a secondary denitration reactor constructed by packing the remaining portion of the catalyst at a position downstream of the plural gas flow passages and adapted to receive the treated gas from the primary denitration reactor and the untreated gas from the bypass means.

3. The apparatus as claimed in claim 2, wherein a gas mixing compartment is formed between the primary denitration apparatus and the secondary denitration apparatus.

4. The apparatus as claimed in claim 1, wherein the catalyst is a platetype catalyst composed of a platetype catalyst carrier and a reducing catalyst supported on the surfaces of the carrier.

5. The apparatus as claimed in claim 1, wherein the apparatus further comprises a means (g) for controlling the molar ratio of the ammonia to be injected by the ammonia injecting means (c) into the $NO_x$-containing untreated gas.

* * * * *